Figure 1:
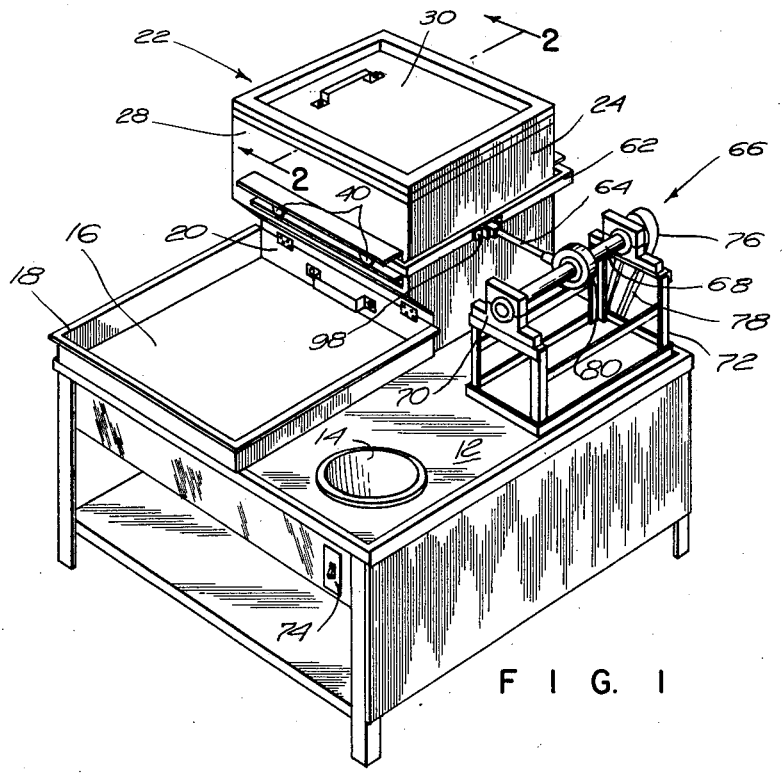

April 14, 1964   J. W. FRANGOS   3,129,167
COMBINATION BREADING TABLE AND POWER SIFTER
Filed Aug. 28, 1961

INVENTOR.
JOHN W. FRANGOS
BY
Morse + Altman
ATTORNEYS

United States Patent Office 3,129,167
Patented Apr. 14, 1964

3,129,167
COMBINATION BREADING TABLE AND
POWER SIFTER
John William Frangos, 2 Brimball Hill Drive,
Beverly, Mass.
Filed Aug. 28, 1961, Ser. No. 134,501
1 Claim. (Cl. 209—315)

This invention relates in general to food preparation appliances and more particularly concerns a novel combination breading table and power operated sifter for maintaining a supply of bread crumbs, flour, meal and the like in a clean dry condition.

In preparing certain foods, such as clams and cutlets, for deep fat frying, an uncooked piece is first dipped into a liquid batter and then transferred to a breading area where it is coated with bread crumbs or flour or a mixture of the two. Where large quantities of food are being prepared, as in restaurants, there is a persistent problem created by loose droplets of batter becoming mixed in with the dry breading mixture to form beads and clumps which adhere to the pieces of food. These beads and clumps collect at random on the food and generally detract from its savory appearance. In addition, these attached clumps may cause uneven cooking of the food and are generally undesirable from every aspect.

While the batch of breading mixture may be discarded once the clumps and beads formed by the batter become objectionable, this would be an expensive and wasteful expedient. Accordingly, it is an object of the present invention to provide a combination breading table and sifting apparatus for maintaining a ready supply of breading mixture in a clean, dry condition.

Another object of this invention is to provide an improved sifting apparatus for separating globules of batter from a charge of breading mixture.

Yet another object of this invention is to provide a novel driving arrangement for laterally vibrating a sifting apparatus.

More particularly, this invention features a food preparation center in which a breading table and power sifting device are conveniently integrated in a single cabinet. A power driven sifting apparatus is located on the cabinet directly adjacent to the breading table so that the breading mixture may be readily transferred from the table to the sifter and back to the table. The operating mechanism for vibrating the sifter in a horizontal plane includes a harness which drivingly joins the sifter to a connecting rod which in turn engages an eccentric inner race bearing assembly. The bearing assembly is mounted to a drive shaft for rotation by an electric motor and furnishes a smooth vibratory movement to the sifter that is particularly effective in separating the mixture.

Figure 2:
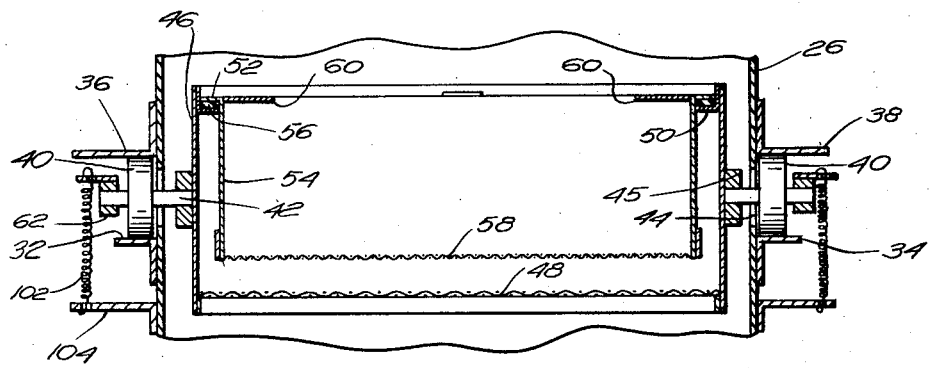
Figure 3:
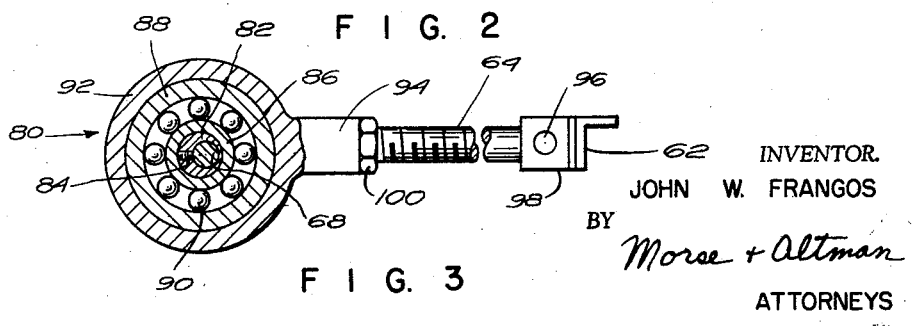

But these and other features of the invention, along with further objects and advantages thereof, will become more readily apparent from the following detailed description, taken in connection with the accompanying drawings in which:

FIG. 1 is a view in perspective of a combination breading table and sifting apparatus made according to the invention, FIG. 2 is a cross-sectional view taken along the line 2—2 of FIG. 1 and, FIG. 3 is a detail view in side elevation, partly in section, of a connecting rod and inner race bearing assembly employed in the invention.

Referring now to the drawings the reference character 10 generally indicates a base cabinet fabricated from stainless steel or other suitable material, and having a flat counter 12 mounted on the top thereof. A batter bowl 14 has been recessed into the counter 12 towards the front and to one side where it is within easy reach of the cook. Normally, the bowl 14 holds a supply of liquid batter consisting of egg yolk and other ingredients.

Located next to the batter bowl 14 towards the front of the counter 10 is an open rectangular breading area 16 enclosed on the front and along its two sides by upright walls 18 and on the rear by a door 20. The door 20 is hinged horizontally to the front base of a power operated sifter indicated generally by the reference character 22.

The sifter housing is a generally box shaped bin having flat end walls 24, a flat rear wall 26 and a stepped front wall 28. A hinged cover 30 provides access to the interior of the bin from the top. Mounted parallel to each other on the front and rear walls of the bin are tracks 32 and 34 formed from angle stock and extending substantially the width of the supporting wall. A second pair of tracks 36 and 38 are mounted in parallel spaced relation above the tracks 32 and 34.

Mounted for limited horizontal movement between the two sets of tracks are anti-frictional rollers 40. Each roller carries an axle 42 which extends through elongated oval openings 44 formed in the walls 26 and 28 between the tracks 32, 36 and the tracks 34, 38. The inner ends of the axles 42 engage an elongated plate 45 fastened to opposite sides of an outer sifting basket 46 of rectangular configuration, open at its top and having a stiff, wide mesh wire screen 48 spanning the lower portion. A narrow lip 50 extends about the upper inner edges of the basket 46 to support an upper flanged edge 52 of an inner basket 54. Lengths of resilient strip material 56 may be disposed between the lip 50 and the flange 52 to provide a cushion between the two baskets.

The inner basket 54, as shown, is somewhat smaller than the outer basket 46 having an open top with a bottom end enclosed by a section of fine mesh wire screen 58. The inner basket 54 is arranged for easy removal from its supporting outer basket 46 and the bin by opening the cover 30 and grasping the inner basket by a pair of attached handles 60. Quick acting locks may be provided for fastening the inner basket snugly in position.

The legs of a U-shaped rigid metal harness 62 engage the outer ends of the axles 42 with the cross piece of the harness being drivingly connected by a rod 64 to a power driven vibrator 66. The vibrator is generally organized about a drive shaft 68 supported at its ends by pillow blocks 70 which are mounted on a frame 72 fastened to the counter 12. An electric motor (not shown), controlled by a switch 74, rotates the drive shaft 68 by means of a pulley 76 and a belt 78.

Eccentrically mounted along the drive shaft 68 is a sealed inner race bearing assembly 80, shown best in FIG. 3, which is connected to the rod 64. This bearing assembly includes an eccentric bushing 82 held fast to the shaft by a set screw 84 and pressed into a concentric inner race 86 of a ball bearing unit. A concentric outer race member 88 is rotatably mounted over a set of bearing balls 90 and a concentric outer annulus 92 is press fitted over the outer race member. A radial boss 94 is formed integral with the annulus 92 and is axially tapped for threaded engagement with one end of the rod 64. The opposite end of the rod 64 is connected to the harness 62 by a swivel device which includes a cross pin 96 fastened radially to the end of the rod and passing through a pad 98 welded to the harness. The effective length of the rod may be readily adjusted by backing off the lock nut 100 and turning the rod so to increase or decrease its length. Once the length has been selected the nut may be run up tight against the boss 94 to its locking position.

It will now be understood that rotation of the drive shaft 68 by the motor operates through the eccentrically mounted inner race bearing assembly 80 to move the harness together with the inner and outer baskets 46 and 54, rapidly back and forth in a horizontal plane. In practice, whenever the beads and globules of batter in the breading mixture becomes excessive, the entire contents of the breading area 16 are transferred by a scoop to the inner basket 54. The sifter is then energized and the small dry particles of breading are sifted down out of the baskets to the bottom of the bin. The door 20 is then opened and the sifted mixture withdrawn to the breading area 16 for use. The residue left on the top of the screen 58 may be removed by simply lifting out the inner basket 54 and dumping the contents into any convenient container.

The sifting apparatus is extremely quick and efficient yet is relatively simple to fabricate. Furthermore, the inner race bearing assembly 80 assures a long trouble free life for the apparatus.

In order to dampen the vibrating action of the baskets into a smooth oscillating motion, a pair of tensioned coil springs 102 connect the harness 62 to a fixed bracket 104 extending from either side of the bin. Preferably the connections are made along both legs of the harness at a point midway between the rollers 46, thereby loading all rollers evenly and insuring proper frictional engagement between the rollers and their supporting tracks. In practice, it has been found that a ¼ hp. electric motor operating at about 1800 r.p.m. provides a satisfactory source of power for the sifter. By coupling the motor to the drive shaft through a 3 to 1 reduction pulley, the baskets are vibrated at approximately 600 v.p.m. through a displacement of perhaps ¾ inch.

While the invention has been described with particular reference to the illustrated embodiments, it will be understood that numerous modifications will appear to those skilled in the art without departing from the invention.

Having thus described my invention, what I claim and desire to obtain by Letters Patent of the United States is:

A food preparation station, comprising a fixed base having a flat upper surface, a low upright wall extending from said surface and defining an enclosed area adapted to receive a quantity of meal placed therein, an upright enclosed sifter mounted in a bin on the upper surface of said base rearwardly adjacent said enclosed area and having a discharge port co-planar with said upper surface and in communication with said area, a door hinged over said port, a foraminous outer basket mounted for limited horizontal vibration within the upper portion of said bin, a foraminous inner basket removably mounted within said outer basket, a door hinged to the upper portion of said bin and covering both of said baskets, elongated tracks mounted horizontally along the sides of said bin, a plurality of rollers rotatably mounted to said outer basket and bearing on said tracks, a horizontally disposed bifurcated harness engaging said rollers, resilient loading means engaging said harness and said bin for pressure loading said rollers to said tracks, a drive shaft mounted adjacent said harness and co-planar therewith, an inner race bearing assembly eccentrically mounted on said shaft, an axially adjustable connecting rod engaging the periphery of said assembly at one end and swivelly connecting said harness at its other end and power means for rotating said shaft to vibrate said baskets in a horizontal plane and thereby sift a charge of meal placed therein whereby the sifted meal is discharged to the bottom of said bin for transfer to said enclosed area.

References Cited in the file of this patent

UNITED STATES PATENTS

| | | |
|---|---|---|
| 638,373 | Arnold | Dec. 5, 1899 |
| 1,132,667 | Milliot | Mar. 23, 1915 |
| 1,483,092 | Krasha | Feb. 12, 1924 |
| 2,297,700 | Hinkle | Oct. 6, 1942 |
| 2,355,131 | Kolleda | Aug. 8, 1944 |

FOREIGN PATENTS

| | | |
|---|---|---|
| 957,861 | France | Feb. 27, 1950 |
| 1,198,534 | France | Dec. 8, 1954 |